United States Patent
Koyo et al.

(10) Patent No.: US 11,442,200 B2
(45) Date of Patent: Sep. 13, 2022

(54) LOW-REFLECTION COATED GLASS SHEET, METHOD FOR PRODUCING LOW-REFLECTION COATED SUBSTRATE, AND COATING LIQUID FOR FORMING LOW-REFLECTION COATING OF LOW-REFLECTION COATED SUBSTRATE

(71) Applicant: Nippon Sheet Glass Company, Limited, Tokyo (JP)

(72) Inventors: Mizuho Koyo, Hyogo (JP); Tatsuhiro Nakazawa, Hyogo (JP); Mitsuhiro Kawazu, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 730 days.

(21) Appl. No.: 16/320,901

(22) PCT Filed: Jul. 7, 2017

(86) PCT No.: PCT/JP2017/025001
§ 371 (c)(1),
(2) Date: Jan. 25, 2019

(87) PCT Pub. No.: WO2018/020989
PCT Pub. Date: Feb. 1, 2018

(65) Prior Publication Data
US 2019/0162877 A1    May 30, 2019

(30) Foreign Application Priority Data
Jul. 28, 2016  (JP) .............................. JP2016-148026

(51) Int. Cl.
| | | |
|---|---|---|
| *G02B 1/11* | (2015.01) | |
| *B05D 5/06* | (2006.01) | |
| *C03C 17/25* | (2006.01) | |
| *B05D 7/24* | (2006.01) | |
| *B05D 3/02* | (2006.01) | |
| *C09D 201/00* | (2006.01) | |
| *C09D 5/00* | (2006.01) | |
| *C09D 183/00* | (2006.01) | |
| *B05D 3/00* | (2006.01) | |
| *G02B 1/111* | (2015.01) | |
| *G02B 1/113* | (2015.01) | |
| *C03C 17/00* | (2006.01) | |
| *B01J 37/02* | (2006.01) | |

(52) U.S. Cl.
CPC .............. *G02B 1/11* (2013.01); *B01J 37/0215* (2013.01); *B05D 3/00* (2013.01); *B05D 3/02* (2013.01); *B05D 5/06* (2013.01); *B05D 7/24* (2013.01); *C03C 17/006* (2013.01); *C03C 17/25* (2013.01); *C09D 5/00* (2013.01); *C09D 183/00* (2013.01); *C09D 201/00* (2013.01); *G02B 1/111* (2013.01); *G02B 1/113* (2013.01)

(58) Field of Classification Search
CPC ............................................ G02B 1/11–1/118
See application file for complete search history.

(56) References Cited

U.S. PATENT DOCUMENTS

| | | | |
|---|---|---|---|
| 2012/0148832 A1 | 6/2012 | Yabuta et al. | |
| 2013/0163087 A1 | 6/2013 | Lecolley et al. | |
| 2014/0329022 A1* | 11/2014 | Otani ....................... | B05D 1/06 427/485 |
| 2015/0004398 A1 | 1/2015 | Yabuta et al. | |
| 2015/0177425 A1 | 6/2015 | Kondo et al. | |
| 2017/0139080 A1 | 5/2017 | Koyo et al. | |
| 2018/0022930 A1 | 1/2018 | Koyo et al. | |

FOREIGN PATENT DOCUMENTS

| | | |
|---|---|---|
| JP | 2013158683 A | 8/2013 |
| JP | 2013537873 A | 10/2013 |
| JP | 2014015543 A | 1/2014 |
| JP | 2014032248 A | 2/2014 |
| WO | 2011021383 A1 | 2/2011 |
| WO | 2016002215 | 1/2016 |
| WO | 2016121404 A1 | 8/2016 |

OTHER PUBLICATIONS

International Search Report issued for International Patent Application No. PCT/JP2017/025001, dated Sep. 19, 2017, 5 pages including English translation.

* cited by examiner

*Primary Examiner* — Prashant J Khatri
(74) *Attorney, Agent, or Firm* — Hamre, Schumann, Mueller & Larson, P.C.

(57) ABSTRACT

A low-reflection coated glass sheet of the present invention includes a glass sheet and a low-reflection coating. The low-reflection coating is formed on at least a portion of one principal surface of the glass sheet and contains a binder containing silica as a main component, fine silica particles bound by the binder, and fine titania particles bound by the binder. The low-reflection coating satisfies the following relationships: 30 mass %<$C_{SP}$<68 mass %; 12 mass %≤$C_{TP}$<50 mass %; 20 mass %<$C_{Binder}$<43.75 mass %; $C_{TP}/C_{Binder}$≥0.6; $C_{Binder}$<25 mass % in the case of $C_{SP}$≥55 mass %; and $C_{TP}$>20 mass % in the case of $C_{SP}$<55 mass %. The low-reflection coated glass sheet has a transmittance gain of 2.0% or more.

12 Claims, No Drawings

LOW-REFLECTION COATED GLASS SHEET, METHOD FOR PRODUCING LOW-REFLECTION COATED SUBSTRATE, AND COATING LIQUID FOR FORMING LOW-REFLECTION COATING OF LOW-REFLECTION COATED SUBSTRATE

TECHNICAL FIELD

The present invention relates to a low-reflection coated glass sheet, a method for producing a low-reflection coated substrate, and a coating liquid for forming a low-reflection coating of a low-reflection coated substrate.

BACKGROUND ART

It is conventional practice to form a low-reflection coating on a glass sheet for the purpose of improving the function of the glass sheet, such as increasing the amount of light to be transmitted through the glass sheet or enabling prevention of glare. A low-reflection coated glass sheet including a glass sheet and a low-reflection coating formed on the glass sheet is used, for example, in a photoelectric conversion device such as a thin-film solar cell. In this case, placing the low-reflection coating on the sunlight-incident side of the low-reflection coated glass sheet allows more sunlight to be introduced to the photoelectric conversion layer or solar cell element of the photoelectric conversion device. This can result in an increase in the electricity generated by the photoelectric conversion device.

For example, Patent Literature 1 describes a cover glass for photoelectric conversion devices that has a reflection-reducing film. This cover glass having the reflection-reducing film is produced by applying a coating liquid containing fine silica particles and a compound as a binder source to a glass sheet having certain surface asperities by spraying, followed by drying and sintering. The average light transmittance of this cover glass in the wavelength range of 380 nm to 1100 nm can be increased by 2.37% or more, as compared to that of a glass sheet having no reflection-reducing film.

Patent Literature 2 describes a glass substrate including a glass sheet and a porous anti-reflection layer formed on the glass sheet. This glass substrate is produced by depositing a blend for priming on one surface of an ultra-transparent glass sheet by dip coating, then drying the blend on the glass sheet to obtain a substrate, then depositing a mixture on the substrate by dip coating, and finally subjecting the substrate to a given heat treatment. The blend for priming is prepared by adding tetraethoxysilane (TEOS) and zirconium acetylacetonate to a given solution. The mixture is prepared by adding tetraethoxysilane (TEOS), aluminum acetylacetonate, and colloidal silica to a given solution. This glass substrate has been observed to exhibit an increase of 2.2% to 2.6% in light transmittance in the wavelength range of 300 nm to 1100 nm.

Patent Literature 3 describes a coating composition prepared by using a PGME-dispersed silica sol and a binder solution. The PGME-dispersed silica sol is one prepared by adding propylene glycol monomethyl ether (PGME) to a dispersion of silica, and the binder solution is one prepared by mixing tetraethoxysilane and aluminum nitrate nonahydrate. An aqueous dispersion of colloidal silica having a dispersed particle diameter greater than an average primary particle diameter is used in the PGME-dispersed silica sol. A coating obtained by using this coating composition has a refractive index of 1.2656 to 1.2960 at a wavelength of 633 nm.

CITATION LIST

Patent Literature

Patent Literature 1: JP 2014-032248 A
Patent Literature 2: JP 2013-537873 A
Patent Literature 3: JP 2014-015543 A

SUMMARY OF INVENTION

Technical Problem

A property called "transmittance gain" is important for low-reflection coated glass sheets. The term "transmittance gain" is used, in relation to average light transmittance in a predetermined wavelength range, to refer to an increase in the average transmittance brought about by formation of a low-reflection coating. Specifically, the transmittance gain is determined by subtracting an average light transmittance of a glass sheet unprovided with a low-reflection coating in a predetermined wavelength range from an average light transmittance of the glass sheet provided with the low-reflection coating in the predetermined wavelength range.

Depending on the environment where a low-reflection coated glass sheet is used, it may be desirable for a low-reflection coating of the low-reflection coated glass sheet to exhibit high photocatalytic activity. However, Patent Literatures 1 to 3 fail to give any particular discussion on the photocatalytic activity of low-reflection coatings of low-reflection coated glass sheets. It is therefore an object of the present invention to provide a new low-reflection coated glass sheet having a high transmittance gain and capable of exhibiting high photocatalytic activity.

Solution to Problem

The present invention provides a low-reflection coated glass sheet including:
a glass sheet; and
a low-reflection coating formed on at least a portion of one principal surface of the glass sheet, the low-reflection coating including a binder containing silica as a main component, fine silica particles bound by the binder, and fine titania particles bound by the binder, wherein
the low-reflection coating satisfies the following relationships when the content of the fine silica particles in the low-reflection coating, the content of the fine titania particles in the low-reflection coating, and the content of the silica of the binder in the low-reflection coating are defined as $C_{SP}$ mass %, $C_{TP}$ mass %, and $C_{Binder}$ mass %, respectively:

30 mass % < $C_{SP}$ < 68 mass %;
12 mass % ≤ $C_{TP}$ < 50 mass %;
20 mass % < $C_{Binder}$ < 43.75 mass %;
$C_{TP}/C_{Binder}$ ≥ 0.6;
$C_{Binder}$ < 25 mass % in the case of $C_{SP}$ ≥ 55 mass %; and
$C_{TP}$ > 20 mass % in the case of $C_{SP}$ < 55 mass %, and
the low-reflection coated glass sheet has a transmittance gain of 2.0% or more, the transmittance gain being determined by subtracting an average light transmittance of the glass sheet unprovided with the low-reflection coating in the wavelength range of 380 nm to 850 nm from an average light transmittance of the low-reflection coated glass sheet in the wavelength range of 380 nm to 850 nm.

The present invention also provides a method for producing a low-reflection coated substrate, the low-reflection coated substrate including:

a substrate; and a low-reflection coating formed on at least a portion of one principal surface of the substrate, the low-reflection coating including a binder containing silica as a main component, fine silica particles bound by the binder, and fine titania particles bound by the binder, wherein the low-reflection coating satisfies the following relationships when the content of the fine silica particles in the low-reflection coating, the content of the fine titania particles in the low-reflection coating, and the content of the silica of the binder in the low-reflection coating are defined as $C_{SP}$ mass %, $C_{TP}$ mass %, and $C_{Binder}$ mass %, respectively:

30 mass % < $C_{SP}$ < 68 mass %;
12 mass % ≤ $C_{TP}$ < 50 mass %;
20 mass % < $C_{Binder}$ < 43.75 mass %;
$C_{TP}/C_{Binder}$ ≥ 0.6;
$C_{Binder}$ < 25 mass % in the case of $C_{SP}$ ≥ 55 mass %; and
$C_{TP}$ > 20 mass % in the case of $C_{SP}$ < 55 mass %, and the low-reflection coated substrate has a transmittance gain of 2.0% or more, the transmittance gain being determined by subtracting an average light transmittance of the substrate unprovided with the low-reflection coating in the wavelength range of 380 nm to 850 nm from an average light transmittance of the low-reflection coated substrate in the wavelength range of 380 nm to 850 nm, the method including: forming a coating film by applying a coating liquid to the substrate; and forming the low-reflection coating by drying and curing the coating film, wherein a maximum temperature reached by a surface of the substrate during the drying and curing of the coating film is 120° C. or higher and 350° C. or lower.

The present invention further provides a coating liquid for forming a low-reflection coating of a low-reflection coated substrate, the low-reflection coating being formed on at least a portion of one principal surface of a substrate, the low-reflection coating including a binder containing silica as a main component, fine silica particles bound by the binder, and fine titania particles bound by the binder, wherein the low-reflection coating satisfies the following relationships when the content of the fine silica particles in the low-reflection coating, the content of the fine titania particles in the low-reflection coating, and the content of the silica of the binder in the low-reflection coating are defined as $C_{SP}$ mass %, $C_{TP}$ mass %, and $C_{Binder}$ mass %, respectively:

30 mass % < $C_{SP}$ < 68 mass %;
12 mass % ≤ $C_{TP}$ < 50 mass %;
20 mass % < $C_{Binder}$ < 43.75 mass %;
$C_{TP}/C_{Binder}$ ≥ 0.6;
$C_{Binder}$ < 25 mass % in the case of $C_{SP}$ ≥ 55 mass %; and
$C_{TP}$ > 20 mass % in the case of $C_{SP}$ < 55 mass %, and the low-reflection coated substrate has a transmittance gain of 2.0% or more, the transmittance gain being determined by subtracting an average light transmittance of the substrate unprovided with the low-reflection coating in the wavelength range of 380 nm to 850 nm from an average light transmittance of the low-reflection coated substrate in the wavelength range of 380 nm to 850 nm, the coating liquid including fine silica particles, fine titania particles, a source material for the binder, and a solvent, wherein the source material for the binder contains a silicon alkoxide, and the solvent contains an organic solvent as a main component, the organic solvent being miscible with water and having a boiling point of 150° C. or lower.

Advantageous Effects of Invention

A low-reflection coated glass sheet of the present invention has a high transmittance gain and is capable of exhibiting high photocatalytic activity.

DESCRIPTION OF EMBODIMENTS

A low-reflection coated glass sheet according to the present invention includes a glass sheet and a low-reflection coating. The low-reflection coating includes a binder containing silica as a main component, fine silica particles bound by the binder, and fine titania particles bound by the binder. The low-reflection coating is formed on at least a portion of one principal surface of the glass sheet. The content of the fine silica particles in the low-reflection coating, the content of the fine titania particles in the low-reflection coating, and the content of the silica of the binder in the low-reflection coating are defined as $C_{SP}$ mass %, $C_{TP}$ mass %, and $C_{Binder}$ mass %, respectively. The low-reflection coating satisfies the following relationships: 30 mass % < $C_{SP}$ < 68 mass %; 12 mass % ≤ $C_{TP}$ < 50 mass %; 20 mass % < $C_{Binder}$ < 43.75 mass %; $C_{TP}/C_{Binder}$ ≥ 0.6; $C_{Binder}$ < 25 mass % in the case of $C_{SP}$ ≥ 55 mass %; and $C_{TP}$ > 20 mass % in the case of $C_{SP}$ < 55 mass %. The low-reflection coated glass sheet has a transmittance gain of 2.0% or more, the transmittance gain being determined by subtracting an average light transmittance of the glass sheet unprovided with the low-reflection coating in the wavelength range of 380 nm to 850 nm from an average light transmittance of the low-reflection coated glass sheet in the wavelength range of 380 nm to 850 nm. Thus, the low-reflection coated glass sheet has a high transmittance gain and is capable of exhibiting high photocatalytic activity upon light irradiation. The "main component" as described herein refers to a component whose content is highest on a mass basis. The "fine particles" as described herein refer to particles having an average particle diameter of less than 1 μm. The "average particle diameter" as described herein is determined by observing a cross-section of the low-reflection coating with a scanning electron microscope (SEM). Specifically, 50 particles the entirety of each of which is observable are randomly selected, the largest and smallest diameters of each particle are measured, the average of the largest and smallest diameters is determined as the particle diameter of the particle, and the average of the particle diameters of the 50 particles is determined as the "average particle diameter".

It may be considered that if the content of a binder containing silica as a main component is high in a low-reflection coating, fine titania particles are covered by the binder, and this makes it difficult to achieve high photocatalytic activity. Additionally, a high content of a binder containing silica as a main component in a low-reflection coating of a low-reflection coated glass sheet may seem disadvantageous for increasing the transmittance gain of the low-reflection coated glass sheet. Thus, the content of a binder containing silica as a main component in a low-reflection coating is commonly controlled to 20 mass % or less. Nevertheless, the present inventors surprisingly made new findings that a low-reflection coated glass sheet can have a high transmittance gain and exhibit high photocatalytic activity even when the content of silica in a binder contained in a low-reflection coating of the low-reflection coated glass sheet is increased to 20 mass % or more. A high content of silica of a binder in a low-reflection coating is advantageous for increasing the mechanical strength of the low-reflection coating. Based on the new findings, the present inventors conducted intensive studies to discover conditions which allow a low-reflection coated glass sheet having a low-reflection coating containing a binder to have a high transmittance gain and exhibit high photocatalytic activity along with increased content of silica of the binder in the low-reflection coating. In consequence, the present inventors have, based on the above new findings, invented the low-reflection coated glass sheet according to the present invention.

In order to ensure that the low-reflection coated glass sheet has a high transmittance gain and is capable of exhibiting high photocatalytic activity, it is desirable for the low-reflection coating to further satisfy the relationship $C_{TP}/C_{Binder} > 0.8$.

In order to ensure that the low-reflection coated glass sheet has a high transmittance gain and is capable of exhibiting high photocatalytic activity, it is desirable for the low-reflection coating to satisfy the relationships 30 mass % < $C_{SP}$ ≤ 65 mass %, 15 mass % ≤ $C_{TP}$ ≤ 40 mass %, and 20 mass % < $C_{Binder}$ ≤ 30 mass %.

In order to ensure that the low-reflection coated glass sheet has a high transmittance gain and is capable of exhibiting high photocatalytic activity, it is more desirable for the low-reflection coating to satisfy the relationships 35 mass % ≤ $C_{SP}$ ≤ 60 mass %, 15 mass % ≤ $C_{TP}$ ≤ 40 mass %, and 20 mass % < $C_{Binder}$ < 25 mass %.

For example, a critical contact angle of water on the low-reflection coating, as defined in Japanese Industrial Standards (JIS) R 1703-1:2007, is 5° or less. Thus, the low-reflection coating has a property which enables easy washing off of dirt attached to the low-reflection coating.

For the low-reflection coated glass sheet according to the present invention, a time tc is 40 hours or less, for example. The time tc is a parameter measured according to JIS R 1703-1:2007 by applying oleic acid to the low-reflection coating and irradiating the coating with ultraviolet light at an intensity of 1.0 mW/cm² and refers to a period of time from the start of the ultraviolet irradiation to the point at which the contact angle of water on the low-reflection coating reaches 5°. A shorter time tc indicates that the low-reflection coated glass sheet can exhibit higher photocatalytic activity. Thus, the low-reflection coated glass sheet according to the present invention can exhibit high photocatalytic activity distinguished by a time tc of 40 hours or less.

The binder may contain, for example, an aluminum compound in addition to silica. When the low-reflection coating contains an aluminum compound, the aluminum compound is preferably derived from a water-soluble inorganic aluminum compound added to a coating liquid for forming the low-reflection coating and is more preferably derived from an aluminum halide, aluminum nitrate, or aluminum phosphate. An aluminum halide preferred in this case is aluminum chloride. The content of the aluminum compound in the low-reflection coating, calculated by assuming the aluminum compound to be $Al_2O_3$, is, for example, 2 to 7 mass % and preferably 4 to 7 mass %. When the low-reflection coating contains an aluminum compound in such an amount, the low-reflection coating tends to have an improved chemical resistance.

Other additives may be contained in the low-reflection coating of the low-reflection coated glass sheet according to the present invention. Examples of the other additives include a titanium compound, a zirconium compound, a zinc compound, and a niobium compound. The inclusion of such an additive can, for example, increase the chemical resistance of the low-reflection coating, such as the resistance of the low-reflection coating to alkali. The low-reflection coating may also contain, for example, 0.1 to 5 mass % of a phosphorus compound calculated as $P_2O_5$.

A hydrolyzable silicon compound such as a silicon alkoxide can be used as a source of the silica in the binder. The silicon alkoxide used in this case can be, for example, tetramethoxysilane, tetraethoxysilane, or tetraisopropoxysilane. It is also possible to use a trifunctional or difunctional silicon alkoxide, examples of which include methyltrimethoxysilane, methyltriethoxysilane, dimethyldiethoxysilane, diethyldiethoxysilane, phenyltriethoxysilane, glycidoxyalkyltrialkoxysilane (such as 3-glycidoxypropyltrimethoxysilane), other epoxysilanes, acrylsilanes, methacrylsilanes, and aminosilanes. The silica of the binder is formed by a sol-gel process which causes such a hydrolyzable silicon compound to undergo hydrolysis and polycondensation.

The low-reflection coating reduces light reflection, due to containing fine silica particles. In order for the low-reflection coated glass sheet to have a high transmittance gain, it is desirable that gaps of appropriate size be formed between the adjacent fine silica particles. From this viewpoint, for example, 30 mass % < $C_{SP}$ < 68 mass % is satisfied, 30 mass % < $C_{SP}$ ≤ 65 mass % is desirably satisfied, and 35 mass % ≤ $C_{SP}$ ≤ 60 mass % is more desirably satisfied.

The fine silica particles contained in the low-reflection coating are solid (non-porous) and substantially spherical. When a fine particle is described as being "substantially spherical", this means that the ratio of the largest diameter to the smallest diameter (largest diameter/smallest diameter) of the fine particle as observed with a SEM is 1.5 or less. In the low-reflection coating, for example, the fine silica particles may be entirely enclosed by the binder. It is desirable, however, that the fine silica particles contained in the low-reflection coating have at least a portion exposed outside the binder, rather than being entirely enclosed by the binder. In order for the fine silica particles to be bound firmly by the binder in the low-reflection coating, the average particle diameter of the fine silica particles is desirably 600 nm or less, more desirably 500 nm or less, and even more desirably 150 nm or less. To prevent the fine silica particles from being aggregated in the low-reflection coating, the average particle diameter of the fine silica particles is desirably 30 nm or more and more desirably 70 nm or more.

By virtue of fine titania particles being contained in the low-reflection coating, the low-reflection coated glass sheet can exhibit photocatalytic activity upon light irradiation. In order for the photocatalytic activity to be exhibited, the low-reflection coating needs to contain fine titania particles in an appropriate amount. From this viewpoint, for example, 12 mass % ≤ $C_{TP}$ < 50 mass % is satisfied, 15 mass % ≤ $C_{TP}$ ≤ 40 mass % is desirably satisfied, and 15 mass % ≤ $C_{TP}$ ≤ 40 mass % is more desirably satisfied.

The fine titania particles contained in the low-reflection coating are solid (non-porous) and substantially spherical. The inclusion of the fine titania particles in the low-reflection coating imparts photocatalytic properties to the low-reflection coating. In addition, due to containing the fine titania particles, the low-reflection coating exhibits a hydrophilic effect when irradiated with light having a predetermined wavelength (400 nm or less, for example). In an aspect, the average particle diameter of the fine silica particles is desirably five or more times the average particle diameter of the fine titania particles. In this case, the fine titania particles can sufficiently enter the spaces formed by the surfaces of the adjacent fine silica particles and the one principal surface of the glass sheet. Additionally, in this case, the low-reflection coated glass sheet is likely to maintain its ability to exhibit photocatalytic properties and hydrophilicity upon light irradiation. In order for the fine titania particles to more easily enter that region of the low-reflection coating which is in contact with the one principal surface of the glass sheet, the average particle diameter of the fine titania particles is, for example, 50 nm or less, desirably 30 nm or less, and more desirably 20 nm or less. In order for the fine titania particles to be uniformly dispersed in a coating liquid for forming the low-reflection coating, the average particle diameter of the fine titania particles is, for example, 3 nm or more and desirably 5 nm or more. In another aspect, the average particle diameter of the fine silica particles is, for example, in the range of two to nine times the average particle diameter of the fine titania particles, and is desirably seven or less times the average particle diameter of the fine titania particles. This provides an improvement in durability of the film along with retention of sufficient photocatalytic activity. If the ratio (average particle diameter of fine silica particles/average particle diameter of fine titania particles) is excessively large, the binder is likely, by a capillary force, to be taken into the gaps between the fine titania particles in the film, so that the amount of the binder participating in binding to the fine silica particles or glass sheet is reduced and that the film tends to have low durability. If the ratio is small, the binder can be distributed appropriately between the fine titania particles themselves and between the fine titania particles and the fine silica particles or glass sheet, thereby binding the particles and the glass sheet to improve the durability of the film. However, if the ratio is excessively small, the surface area of the fine titania particles in the film is reduced, so that the photocatalytic activity tends to decrease. From this viewpoint, the average particle diameter of the fine titania particles is, for example, 30 to 70 nm, desirably more than 30 nm and 60 nm or less, and more desirably 35 to 50 nm.

As previously mentioned, the low-reflection coating is formed on at least a portion of one principal surface of a glass sheet. The morphology of the one principal surface of the glass sheet is not particularly limited. For example, the arithmetic average roughness Ra of the glass sheet is 1 nm or less and desirably 0.5 nm or less. The arithmetic average roughness Ra is defined herein according to JIS B 0601:1994.

The glass sheet may be figured glass having one principal surface with asperities. The mean spacing Sm of the asperities is 0.3 mm or more and 2.5 mm or less, desirably 0.3 mm or more, more desirably 0.4 mm or more, and particularly desirably 0.45 mm or more. The mean spacing Sm is 2.5 mm or less, desirably 2.1 mm or less, more desirably 2.0 mm or less, and particularly desirably 1.5 mm or less. The mean spacing Sm as defined herein refers to an average of lengths of peak-valley periods in a roughness profile which are determined based on points at which the roughness profile intersects the mean line. It is further desirable that the surface asperities of the figured glass sheet have a maximum height Ry of 0.5 µm to 10 µm, particularly 1 µm to 8 µm, as well as having a mean spacing Sm within the above range. The mean spacing Sm and the maximum height Ry as defined herein correspond to those as specified in JIS B 0601:1994. It is desirable that the surface asperities of the glass sheet in the form of figured glass have an arithmetic average roughness Ra of 0.3 µm to 5.0 µm, particularly 0.4 µm to 2.0 µm, more particularly 0.5 µm to 1.2 µm, as well as having a mean spacing Sm and a maximum height Ry within the above ranges. The figured glass as described above exhibits a sufficient anti-glare effect attributed to its surface asperities; however, when the roughness of the surface is excessively large, reflected color is likely to become uneven in the surface. The glass sheet is desirably as free of coloring components as possible, although the composition of the glass sheet is not particularly limited. In the glass sheet, for example, the content of iron oxide, which is a typical coloring component, is desirably 0.06 mass % or less and more desirably 0.02 mass % or less when calculated as $Fe_2O_3$ content.

The low-reflection coated glass sheet may further include a transparent electrode film on a principal surface of the glass sheet opposite to the principal surface on which the low-reflection coating is to be formed. In this case, for example, one or more underlayers and a transparent electrode layer containing fluorine-doped tin oxide as a main component are stacked in order on the principal surface of the glass sheet opposite to the principal surface on which the low-reflection coating is to be formed.

The thickness of the low-reflection coating is not particularly limited and is, for example, 80 nm to 500 nm, desirably 100 nm to 300 nm, and more desirably 100 nm to 180 nm.

Next, an example of the method for producing the low-reflection coated glass sheet according to the present invention will be described. The low-reflection coated glass sheet can be produced by applying a coating liquid for forming the low-reflection coating to at least a portion of one principal surface of the glass sheet and drying and curing the resulting film of the applied coating liquid.

The coating liquid is a liquid containing a source of a binder, fine silica particles, and fine titania particles. The source of the binder is prepared, for example, by adding a hydrolysis catalyst and a hydrolyzable silicon compound such as a silicon alkoxide sequentially to a given solvent under stirring. The hydrolysis of the hydrolyzable silicon compound can be carried out in any appropriate manner. The hydrolysis of the hydrolyzable silicon compound is desirably carried out in a solution containing the fine silica particles, because this promotes a polycondensation reaction between silanol groups present on the surfaces of the fine silica particles and silanol groups formed by hydrolysis of the hydrolyzable silicon compound, thus leading to an increase in the proportion of the silica that contributes to binding between the fine silica particles in the binder. Specifically, the coating liquid is prepared, for example, by adding a hydrolysis catalyst and a hydrolyzable silicon compound such as a silicon alkoxide sequentially to a dispersion of fine silica particles under stirring. In some cases, the preparation of the coating liquid may be accomplished by hydrolysis of the hydrolyzable silicon compound followed by addition of the fine silica particles. The fine titania particles can be added at any time during the preparation of the coating liquid. The coating liquid is prepared, for example, by adding a hydrolysis catalyst and a hydrolyzable silicon compound such as a silicon alkoxide sequentially to a mixture of a dispersion of fine silica particles and a dispersion of fine titania particles under stirring. For example, when the low-reflection coating is to contain an aluminum compound, aluminum nitrate or an aluminum halide such as aluminum chloride is added as a precursor of the aluminum compound to the coating liquid. Either an acid or a base can be used as the hydrolysis catalyst. It is desirable to use an acid, particularly an inorganic acid, more particularly hydrochloric acid, in terms of the stability of the coating liquid. It is desirable to use as the hydrolysis catalyst an acid having a high degree of electrolytic dissociation in an aqueous solution. Specifically, it is desirable to use an acid having an acid dissociation constant pKa (which refers to the first acid dissociation constant when the acid is a polybasic acid) of 2.5 or less. Examples of acids desired as the hydrolysis catalyst include: (i) volatile inorganic acids such as hydrochloric acid and nitric acid; (ii) organic acids such as trifluoroacetic acid, methanesulfonic acid, benzenesulfonic acid, and p-toluenesulfonic acid; (iii) polybasic acids such as maleic acid, phosphoric acid, and oxalic acid; (iv) sulfuric acid; and (v) sulfamic acid. An acidic hydrolysis catalyst allows better dispersion of the fine silica particles and fine titania particles than a basic hydrolysis catalyst. Furthermore, chlorine ions derived from hydrochloric acid enhance the effect (high chemical resistance of the low-reflection coating to salt spray) provided by inclusion of an aluminum compound in the low-reflection coating.

The coating liquid contains a solvent, and the solvent contains, for example, an organic solvent as a main component, the organic solvent being miscible with water and having a boiling point of 150° C. or lower. The boiling point of the organic solvent contained as a main component in the solvent is, for example, 70° C. or higher. Desirably, the coating liquid further contains a high-boiling organic solvent miscible with water and with the above organic solvent as a main component and having a boiling point higher than 150° C. The boiling point of the high-boiling organic solvent is desirably 200° C. or lower. The high-boiling organic solvent used can be, for example, propylene glycol (boiling point: 187° C.), diacetone alcohol (boiling point: 168° C.), hexylene glycol (boiling point: 198° C.), or 3-methoxybutanol (boiling point: 161° C.). When the coating liquid contains a high-boiling solvent, a continuous film free of defects and being uniform can easily be obtained, and such a film has an improved durability. The high-boiling solvent acts, in the process of drying of a liquid film of the applied coating liquid, to reduce the rate of solvent volatilization and equalize the rate of volatilization over the surface of the film. Thus, the dispersion stability of the fine titania particles and fine silica particles in the liquid film is maintained, so that the aggregation of these fine particles can be prevented during the drying process. Further, undesirable meniscus caused by local drying of the liquid film can be prevented to improve the leveling of the liquid film. The content of the high-boiling solvent in the coating liquid is preferably 1 to 20 mass %.

The technique used to apply the coating liquid to a principal surface of the glass sheet is not particularly limited, and can be, for example, spin coating, roll coating, bar coating, dip coating, or spray coating. From the viewpoint of mass production efficiency and uniformity of the appearance of the film of the applied coating liquid, it is desirable to use roll coating or bar coating to apply the coating liquid to a principal surface of the glass sheet. From the viewpoint of mass production efficiency, spray coating may be employed to apply the coating liquid to a principal surface of the glass sheet.

The technique used to dry and cure the film of the coating liquid applied to a principal surface of the glass sheet is not particularly limited and, for example, the film of the applied coating liquid can be dried and cured by hot air drying. In this case, the conditions such as the temperature of the glass sheet are not particularly limited. When the film of the applied coating liquid is dried and cured by hot air drying, for example, it is desirable that the maximum temperature reached by the principal surface of the glass sheet on which the coating liquid has been applied be 200° C. or higher and 350° C. or lower and that the period of time during which the principal surface of the glass sheet has a temperature of 200° C. or higher be 5 minutes or less. In this case, the low-reflection coated glass sheet is likely to have a high transmittance gain and exhibit high photocatalytic activity. When the film of the applied coating liquid is dried and cured by hot air drying, the maximum temperature reached by the principal surface of the glass sheet on which the coating liquid has been applied may be 120° C. or higher and 250° C. or lower, and the period of time during which the principal surface of the glass sheet has a temperature of 120° C. or higher may be 3 minutes or less.

EXAMPLES

Hereinafter, the present invention will be described in more detail by examples. It should be understood that the present invention is not limited to the examples given below. First, methods for testing or measurement conducted on low-reflection coated glass sheets according to Examples and Comparative Examples will be described.

(Transmittance Gain)

The transmittance spectrum of each of the low-reflection coated glass sheets according to Examples and Comparative Examples was measured using a spectrophotometer (UV-3100 PC manufactured by Shimadzu Corporation). The values of transmittance were averaged in the wavelength range of 380 nm to 850 nm in the transmittance spectrum to calculate an average transmittance. For the transmittance spectrum measurement, incident light was applied to the low-reflection coating of each of the low-reflection coated glass sheets according to Examples and Comparative Examples. In addition, for each of the glass sheets used in Examples and Comparative Examples, the measurement of transmittance spectrum and the calculation of average transmittance were performed in the absence of any low-reflection coating formed on the glass sheet. In each of Examples and Comparative Examples, a transmittance gain was calculated by subtracting the average transmittance of the glass sheet unprovided with any low-reflection coating from the average transmittance of the low-reflection coated glass sheet that had not been subjected to any reciprocating abrasion test. The results are shown in Table 1.

(Critical Contact Angle of Water)

For each of the low-reflection coated glass sheets according to Examples and Comparative Examples, the low-reflection coating was irradiated with ultraviolet light (dominant wavelength: 351 nm, energy density: 1 mW/cm$^2$) using blacklight for 16 hours. After that, the contact angle of a water droplet on the surface of the low-reflection coating was measured using a contact angle meter (manufactured by Kyowa Interface Science Co., Ltd., product name: DropMaster 300). The results are shown in Table 1. Before the ultraviolet irradiation, the surface of the low-reflection coating was wiped with a cloth impregnated with methanol.

(Photocatalytic Activity)

According to JIS R 1703-1:2007, oleic acid was applied to each of the low-reflection coatings of Examples, subsequently the low-reflection coating was irradiated with ultraviolet light at an intensity of 1.0 mW/cm$^2$, and the time tc from the start of the ultraviolet irradiation to the point at which the contact angle of water on the low-reflection coating reached 5° was measured. For the measurement of the contact angle of water on the low-reflection coating, a contact angle meter (manufactured by Kyowa Interface Science Co., Ltd., product name: DropMaster 300) was used. The results are shown in Table 1.

(SEM Observation)

The low-reflection coating of each of the low-reflection coated glass sheets according to Examples and Comparative Examples was observed with a field emission scanning electron microscope (manufactured by Hitachi, Ltd., model: S-4500), which is abbreviated as FE-SEM. Based on a FE-SEM cross-sectional image of the low-reflection coating observed from above at an angle of 30°, the thickness of the low-reflection coating was measured at five measurement points, and the average of the five measured values was determined as the average thickness of the low-reflection coating. The results are shown in Table 1.

Example 1

30.1 parts by mass of a dispersion of fine silica particles (manufactured by FUSO CHEMICAL CO., LTD.; product name: "QuartronPL-7", average primary particle diameter of fine silica particles: 125 nm, solids concentration: 23 wt %), 58.2 parts by mass of 1-methoxy-2-propanol (solvent), and 1.0 parts by mass of 1N hydrochloric acid (hydrolysis catalyst) were stirred and mixed. While the mixture was further stirred, 10.6 parts by mass of tetraethoxysilane (ethyl orthosilicate, manufactured by TAMA CHEMICALS CO., LTD.; a source of silica for the binder) was added to the mixture. The stirring was continued for 8 hours with the temperature maintained at 40° C., and the tetraethoxysilane was thus hydrolyzed to obtain a raw material liquid according to Example 1. 47.7 g of the raw material liquid, 1.0 g of propylene glycol (solvent), 47.2 g of 1-methoxy-2-propanol, and 4.1 g of a dispersion of fine titania particles (an aqueous dispersion acidified with nitric acid, manufactured by ISHIHARA SANGYO KAISHA, LTD.; product name: "Photocatalytic Titanium Dioxide, STS-01", solids concentration: 30 mass %, average primary particle diameter of fine titania particles: 7 nm) were stirred and mixed to obtain a coating liquid according to Example 1. The solids concentration in the total coating liquid according to Example 1 was 6.0 mass %, where the mass of solids in the coating liquid was defined as the sum of the mass of tetraethoxysilane (source of silica for the binder) calculated as $SiO_2$, the mass of solids of the dispersion of fine silica particles, the mass of solids of the dispersion of fine titania particles, the mass of the optionally-added aluminum compound calculated as $Al_2O_3$, and the mass of the optionally-added additive calculated as metal oxide. It should be noted that neither aluminum compound nor any other additive was added to the coating liquid according to Example 1. The solids of the coating liquid according to Example 1 included 55.1 mass % of fine silica particles, 20.5 mass % of fine titania particles, and 24.4 mass % of tetraethoxysilane calculated as $SiO_2$.

A glass sheet with a transparent conductive film was prepared. This glass sheet was a 3.2-mm-thick glass sheet manufactured by Nippon Sheet Glass Co., Ltd. This glass sheet had a typical soda-lime-silicate composition and had a transparent conductive film formed by on-line CVD on one principal surface of the glass sheet, the transparent conductive film including a transparent conductive layer. As seen from the fact that this glass sheet had a transparent conductive film formed by on-line CVD, the glass sheet coated with the transparent conductive film was a glass sheet formed by a float process. The transparent conductive film lay on that principal surface of the glass sheet which was formed of glass that had not been in contact with a molten tin in a float bath (this principal surface is generally called "top surface"). This glass sheet was cut into a 200 mm×300 mm piece, which was immersed in an alkaline solution (LBC-1, an alkaline cleaning liquid manufactured by LEYBOLD Co., Ltd.) and washed using an ultrasonic cleaner. The piece of glass sheet was rinsed with deionized water and then dried at ordinary temperature. A glass sheet for low-reflection coating formation was thus produced. The coating liquid according to Example 1 was applied using a roll coater to the principal surface of the glass sheet opposite to the principal surface coated with the transparent conductive film. The application of the coating liquid was done in such a manner that the applied liquid formed a film having a thickness of 1 µm to 5 µm. Next, the film of the coating liquid applied to the glass sheet was dried and cured using a belt conveyor-type hot air dryer. Specifically, the glass sheet was moved back and forth twice in the interior of the hot air dryer to pass the glass sheet under a hot air injection nozzle four times, with the temperature of hot air set to 300° C., the distance between the hot air injection nozzle and glass sheet set to 5 mm, and the conveyance speed set to 0.5 m/min. In this process, the period of time during which the glass sheet with the applied coating liquid was in contact with hot air was 140 seconds, and the maximum temperature reached by the glass sheet's principal surface with the applied coating liquid was 199° C. After that, the glass sheet was left to cool to room temperature to obtain a low-reflection coated glass sheet according to Example 1. Thus, in Example 1, the low-reflection coating was formed on the principal surface of the glass sheet which was formed of glass that had been in contact with a molten tin in a float bath (this principal surface is generally called "bottom surface").

Examples 2 to 8

Coating liquids according to Examples 2 to 8 were prepared in the same manner as the coating liquid according to Example 1, except for adjusting the amounts of the added raw materials so that, in solids of each of the coating liquids according to Examples 2 to 8, the content of fine silica particles, the content of fine titania particles, and the content of tetraethoxysilane (source of silica for the binder) calculated as $SiO_2$ would be as shown in Table 1. The solids concentration in each of the coating liquids according to Examples 2 to 8 was 5 mass %. Low-reflection coated glass sheets according to Examples 2 to 8 were produced in the same manner as the low-reflection coated glass sheet according to Example 1, except for using the coating liquids according to Examples 2 to 8 instead of the coating liquid according to Example 1.

Comparative Examples 1 to 3

Coating liquids according to Comparative Examples 1 to 3 were prepared in the same manner as the coating liquid according to Example 1, except for adjusting the amounts of the added raw materials so that, in solids of each of the coating liquids according to Comparative Examples 1 to 3, the content of fine silica particles, the content of fine titania particles, and the content of tetraethoxysilane (source of silica for the binder) calculated as $SiO_2$ would be as shown in Table 1. The solids concentration in each of the coating liquids according to Comparative Examples 1 to 3 was 5 mass %. Low-reflection coated glass sheets according to Comparative Examples 1 to 3 were produced in the same manner as the low-reflection coated glass sheet according to Example 1, except for using the coating liquids according to Comparative Examples 1 to 3 instead of the coating liquid according to Example 1.

As shown in Table 1, the transmittance gain was 2.0% or more for the low-reflection coated glass sheets according to Examples. By contrast, for the low-reflection coated glass sheets according to Comparative Examples, the transmittance gain was less than 2.0%. This indicated that the low-reflection coated glass sheets according to Examples have a high transmittance gain.

As shown in Table 1, the critical contact angle of water on the low-reflection coating was 5° or less (3.0° or less, in fact) for the low-reflection coated glass sheets of Examples. This indicated that dirt attached to the low-reflection coatings of the low-reflection coated glass sheets of Examples would easily be washed off.

As shown in Table 1, the time tc as an index of photocatalytic activity was 40 hours or less (35 hours or less, in fact) for the low-reflection coated glass sheets of Examples. This indicated that the low-reflection coated glass sheets of Examples can exhibit high photocatalytic activity.

TABLE 1

|  | Contents of components in low-reflection coating | | | Average thickness of low-reflection coating [nm] | $C_{TP}/C_{Binder}$ | Transmittance gain [%] | tc [hours] | Critical contact angle of water [°] |
|---|---|---|---|---|---|---|---|---|
|  | Fine silica particles $C_{SP}$ [mass %] | Fine titania particles $C_{TP}$ [mass %] | Silica in binder $C_{Binder}$ [mass %] |  |  |  |  |  |
| Example 1 | 55.1 | 20.5 | 24.4 | 180 | 0.84 | 2.35 | 32 | 1.9 |
| Example 2 | 50.0 | 25.6 | 24.4 | 160 | 1.05 | 2.33 | 20 | 1.6 |
| Example 3 | 46.3 | 29.4 | 24.3 | 130 | 1.21 | 2.21 | 12 | 1.2 |
| Example 4 | 40.7 | 34.9 | 24.4 | 130 | 1.43 | 2.17 | 7 | 0.9 |
| Example 5 | 35.6 | 40.0 | 24.4 | 130 | 1.64 | 2.09 | 6 | 1.0 |
| Example 6 | 40.1 | 39.4 | 20.5 | 130 | 1.92 | 2.22 | 5 | 0.9 |
| Example 7 | 40.0 | 30.0 | 30.0 | 140 | 1.00 | 2.02 | 25 | 2.6 |
| Example 8 | 59.7 | 15.9 | 24.4 | 150 | 0.65 | 2.51 | 35 | 3.0 |
| Comparative Example 1 | 30.0 | 30.0 | 40.0 | 140 | 0.75 | 1.69 | — | 3.1 |
| Comparative Example 2 | 20.0 | 30.0 | 50.0 | 130 | 0.60 | 0.83 | — | 3.9 |
| Comparative Example 3 | 30.0 | 40.0 | 30.0 | 130 | 1.33 | 1.90 | — | 2.3 |

The invention claimed is:

1. A low-reflection coated glass sheet comprising:
a glass sheet; and
a low-reflection coating formed on at least a portion of one principal surface of the glass sheet, the low-reflection coating comprising a binder containing silica as a main component, fine silica particles bound by the binder, and fine titania particles bound by the binder, wherein
the low-reflection coating satisfies the following relationships when the content of the fine silica particles in the low-reflection coating, the content of the fine titania particles in the low-reflection coating, and the content of the silica of the binder in the low-reflection coating are defined as $C_{SP}$ mass %, $C_{TP}$ mass %, and $C_{Binder}$ mass %, respectively:
30 mass % < $C_{SP}$ < 68 mass %;
12 mass % ≤ $C_{TP}$ < 50 mass %;
20 mass % < $C_{Binder}$ < 43.75 mass %;
$C_{TP}/C_{Binder}$ ≥ 0.6;
$C_{Binder}$ < 25 mass % in the case of $C_{SP}$ ≥ 55 mass %; and
$C_{TP}$ > 20 mass % in the case of $C_{SP}$ < 55 mass %, and
the low-reflection coated glass sheet has a transmittance gain of 2.0% or more, the transmittance gain being determined by subtracting an average light transmittance of the glass sheet unprovided with the low-reflection coating in the wavelength range of 380 nm to 850 nm from an average light transmittance of the low-reflection coated glass sheet in the wavelength range of 380 nm to 850 nm.

2. The low-reflection coated glass sheet according to claim 1, wherein the low-reflection coating further satisfies the relationship $C_{TP}/C_{Binder}$ > 0.8.

3. The low-reflection coated glass sheet according to claim 1, wherein the low-reflection coating further satisfies the following relationships:
30 mass % < $C_{SP}$ ≤ 65 mass %;
15 mass % ≤ $C_{TP}$ ≤ 40 mass %; and
20 mass % < $C_{Binder}$ ≤ 30 mass %.

4. The low-reflection coated glass sheet according to claim 1, wherein the low-reflection coating further satisfies the following relationships:
35 mass % ≤ $C_{SP}$ ≤ 60 mass %;
15 mass % ≤ $C_{TP}$ ≤ 40 mass %; and
20 mass % < $C_{Binder}$ < 25 mass %.

5. The low-reflection coated glass sheet according to claim 1, wherein a critical contact angle of water on the low-reflection coating, as defined in Japanese Industrial Standard (JIS) R 1703-1:2007, is 5° or less.

6. The low-reflection coated glass sheet according to claim 1, wherein when, according to JIS R 1703-1:2007, oleic acid is applied to the low-reflection coating and subsequently the low-reflection coating is irradiated with ultraviolet light at an intensity of 1.0 mW/cm², a period of time from start of the ultraviolet irradiation to a point at which a contact angle of water on the low-reflection coating reaches 5° is 40 hours or less.

7. A method for producing a low-reflection coated glass sheet according to claim 1,
the method comprising: forming a coating film by applying a coating liquid to the glass sheet; and forming the low-reflection coating by drying and curing the coating film, wherein a maximum temperature reached by a surface of the glass sheet during the drying and curing of the coating film is 120° C. or higher and 350° C. or lower.

8. The method according to claim 7, wherein in the drying and curing of the coating film, a period of time during which the surface of the glass sheet has a temperature of 200° C. or higher is 5 minutes or less.

9. The method according to claim 7, wherein in the drying and curing of the coating film, a period of time during which the surface of the glass sheet has a temperature of 120° C. or higher is 3 minutes or less.

10. The method according to claim 7, wherein
the coating liquid comprises fine silica particles, fine titania particles, a source material for the binder, and a solvent,
the source material for the binder comprises a silicon alkoxide, and
the solvent comprises an organic solvent as a main component, the organic solvent being miscible with water and having a boiling point of 150° C. or lower.

11. A coating liquid for forming a low-reflection coating of a low-reflection coated glass sheet according to claim 1,
the low-reflection coating being formed on at least a portion of one principal surface of the glass sheet, the low-reflection coating including a binder containing silica as a main component, fine silica particles bound by the binder, and fine titania particles bound by the binder, wherein
the coating liquid comprising fine silica particles, fine titania particles, a source material for the binder, and a solvent, wherein
the source material for the binder comprises a silicon alkoxide, and
the solvent comprises an organic solvent as a main component, the organic solvent being miscible with water and having a boiling point of 150° C. or lower.

12. The coating liquid according to claim 11, further comprising an acid having an acid dissociation constant pKa of 2.5 or less as a hydrolysis catalyst for hydrolysis of the silicon alkoxide.

* * * * *